(12) United States Patent
Mason et al.

(10) Patent No.: US 7,949,693 B1
(45) Date of Patent: May 24, 2011

(54) LOG-STRUCTURED HOST DATA STORAGE

(75) Inventors: W. Anthony Mason, Milford, NH (US); Peter G. Viscarola, Mont Vernon, NH (US)

(73) Assignee: OSR Open Systems Resources, Inc., Amherst, NH (US)

( * ) Notice: Subject to any disclaimer, the term of this patent is extended or adjusted under 35 U.S.C. 154(b) by 510 days.

(21) Appl. No.: 11/844,102

(22) Filed: Aug. 23, 2007

(51) Int. Cl.
*G06F 17/30* (2006.01)

(52) U.S. Cl. .......................................... 707/828

(58) Field of Classification Search .......... None
See application file for complete search history.

(56) References Cited

U.S. PATENT DOCUMENTS

| | | | |
|---|---|---|---|
| 4,135,240 A | 1/1979 | Ritchie | |
| 4,959,811 A | 9/1990 | Szczepanek | |
| 4,984,153 A | 1/1991 | Kregness et al. | |
| 5,027,395 A | 6/1991 | Anderson et al. | |
| 5,488,701 A | 1/1996 | Brady et al. | |
| 5,506,983 A | 4/1996 | Atkinson et al. | |
| 5,530,850 A | 6/1996 | Ford et al. | |
| 5,537,588 A | 7/1996 | Engelmann et al. | |
| 5,551,003 A | 8/1996 | Mattson et al. | |
| 5,606,983 A | 3/1997 | Monty et al. | |
| 5,652,879 A | 7/1997 | Harris et al. | |
| 5,664,178 A | 9/1997 | Sinofsky | |
| 5,706,504 A | 1/1998 | Atkinson et al. | |
| 5,715,441 A | 2/1998 | Atkinson et al. | |
| 5,734,861 A | 3/1998 | Cohn et al. | |
| 5,752,252 A | 5/1998 | Zbikowski et al. | |
| 5,757,915 A | 5/1998 | Aucsmith et al. | |
| 5,764,880 A | 6/1998 | Gerdt et al. | |
| 5,781,797 A | 7/1998 | Crick et al. | |
| 5,799,324 A | 8/1998 | McNutt et al. | |
| 5,802,344 A | 9/1998 | Menon et al. | |
| 5,832,515 A | 11/1998 | Ledain et al. | |
| 5,857,207 A | 1/1999 | Lo et al. | |
| 5,873,097 A | 2/1999 | Harris et al. | |
| 5,923,878 A | 7/1999 | Marsland | |
| 5,991,893 A | 11/1999 | Sinder | |
| 5,996,054 A | 11/1999 | Ledain et al. | |
| 6,006,227 A | 12/1999 | Freeman et al. | |
| 6,021,408 A | 2/2000 | Ledain et al. | |
| 6,021,509 A | 2/2000 | Gerdt et al. | |
| 6,038,668 A | 3/2000 | Chipman et al. | |
| 6,065,100 A | 5/2000 | Schafer et al. | |
| 6,079,047 A | 6/2000 | Cotugno et al. | |
| 6,101,186 A | 8/2000 | Craig | |
| 6,108,420 A | 8/2000 | Larose et al. | |
| 6,128,630 A | 10/2000 | Shackelford | |

(Continued)

OTHER PUBLICATIONS

Office Action issued on Mar. 19, 2008 in U.S. Appl. No. 11/145,433.

(Continued)

*Primary Examiner* — Don Wong
*Assistant Examiner* — Belinda Xue

(57) ABSTRACT

Methods of communicating data between a host and a client. The methods may comprise the step of receiving a write request from a client. The write request may comprise first data and first metadata describing a logical position of the first data within a file. The first data may be encrypted to the host. The methods may also comprise the step of writing the first data to a data storage. The first data may be written as a data sub-file of the file. In addition, the methods may comprise the step of writing the first metadata to the data storage. The first metadata may be written as a metadata sub-file of the file.

10 Claims, 7 Drawing Sheets

U.S. PATENT DOCUMENTS

| | | | |
|---|---|---|---|
| 6,148,368 A | 11/2000 | DeKoning |
| 6,240,527 B1 | 5/2001 | Schneider |
| 6,260,036 B1 | 7/2001 | Almasi et al. |
| 6,321,239 B1 | 11/2001 | Shackelford |
| 6,336,164 B1 | 1/2002 | Gerdt et al. |
| 6,347,397 B1 | 2/2002 | Curtis |
| 6,366,987 B1 | 4/2002 | Tzelnic et al. |
| 6,377,958 B1 | 4/2002 | Orcutt |
| 6,381,682 B2 | 4/2002 | Noel et al. |
| 6,418,509 B1 | 7/2002 | Yanai et al. |
| 6,430,548 B1 | 8/2002 | Deis et al. |
| 6,438,594 B1 | 8/2002 | Bowman-Amuah |
| 6,449,688 B1 | 9/2002 | Peters et al. |
| 6,490,664 B1 | 12/2002 | Jones et al. |
| 6,526,570 B1 | 2/2003 | Click, Jr. et al. |
| 6,529,909 B1 | 3/2003 | Bowman-Amuah |
| 6,535,949 B1 | 3/2003 | Parker |
| 6,577,254 B2 | 6/2003 | Rasmussen |
| 6,597,812 B1 | 7/2003 | Fallon et al. |
| 6,601,104 B1 | 7/2003 | Fallon |
| 6,604,158 B1 | 8/2003 | Fallon |
| 6,624,761 B2 | 9/2003 | Fallon |
| 6,625,671 B1 | 9/2003 | Collette et al. |
| 6,628,411 B2 | 9/2003 | Miller et al. |
| 6,633,244 B2 | 10/2003 | Avery et al. |
| 6,633,883 B2 | 10/2003 | Koskas |
| 6,643,405 B1 | 11/2003 | Sako |
| 6,643,652 B2 | 11/2003 | Helgeson et al. |
| 6,654,851 B1 | 11/2003 | McKean |
| 6,657,565 B2 | 12/2003 | Kampf |
| 6,664,903 B2 | 12/2003 | Kugai |
| 6,704,839 B2 | 3/2004 | Butterworth et al. |
| 6,711,709 B1 | 3/2004 | York |
| 6,732,125 B1 | 5/2004 | Autrey et al. |
| 6,738,863 B2 | 5/2004 | Butterworth et al. |
| 6,741,747 B1 | 5/2004 | Burns et al. |
| 6,775,781 B1 | 8/2004 | Phillips et al. |
| 6,782,319 B1 | 8/2004 | McDonough |
| 6,785,768 B2 | 8/2004 | Peters et al. |
| 6,795,640 B1 | 9/2004 | Honda |
| 6,795,897 B2 | 9/2004 | Benveniste et al. |
| 6,847,681 B2 | 1/2005 | Saunders et al. |
| 6,856,993 B1 | 2/2005 | Verma et al. |
| 6,901,403 B1 | 5/2005 | Bata et al. |
| 6,944,619 B2 | 9/2005 | Gruenwald |
| 6,983,456 B2 | 1/2006 | Poznanovic et al. |
| 7,051,031 B2 | 5/2006 | Schein |
| 7,085,766 B2 | 8/2006 | Keith, Jr. |
| 7,088,823 B2 | 8/2006 | Fetkovich |
| 7,107,267 B2 | 9/2006 | Taylor |
| 7,191,189 B2 | 3/2007 | Bhatti |
| 7,340,581 B2 | 3/2008 | Gorobets et al. |
| 7,370,319 B2 | 5/2008 | Pensak et al. |
| 7,392,383 B2 | 6/2008 | Basibes et al. |
| 7,444,625 B2 | 10/2008 | Anwar et al. |
| 7,523,221 B2 | 4/2009 | Hillberg |
| 7,530,016 B2 | 5/2009 | Sahota et al. |
| 7,536,418 B2 * | 5/2009 | Buchsbaum et al. ......... 707/200 |
| 7,702,995 B2 | 4/2010 | Sahota et al. |
| 2002/0052868 A1 | 5/2002 | Mohindra et al. |
| 2002/0073066 A1 | 6/2002 | Coutts et al. |
| 2002/0143735 A1 | 10/2002 | Ayi et al. |
| 2003/0110478 A1 | 6/2003 | Duesterwald et al. |
| 2003/0123446 A1 | 7/2003 | Muirhead et al. |
| 2004/0015958 A1 | 1/2004 | Veil et al. |
| 2004/0167916 A1 | 8/2004 | Basso et al. |
| 2004/0186920 A1 | 9/2004 | Birdwell et al. |
| 2005/0144189 A1 | 6/2005 | Edwards et al. |
| 2005/0240966 A1 | 10/2005 | Hindle et al. |
| 2006/0031246 A1 | 2/2006 | Grayson |
| 2006/0070076 A1 | 3/2006 | Ma |
| 2006/0101025 A1 | 5/2006 | Tichy et al. |
| 2006/0123250 A1 | 6/2006 | Maheshwari et al. |
| 2006/0195476 A1 | 8/2006 | Nori et al. |
| 2006/0277153 A1 | 12/2006 | Mason et al. |
| 2008/0134154 A1 | 6/2008 | Patel et al. |
| 2009/0249277 A1 | 10/2009 | Prakash |

OTHER PUBLICATIONS

Office Action (Interview Summary) issued on May 23, 2008 in U.S. Appl. No. 11/145,433.
Office Action issued on Sep. 16, 2008 in U.S. Appl. No. 11/145,433.
Office Action issued on Sep. 8, 2008 in U.S. Appl. No. 11/505,582.
U.S. Appl. No. 11/505,582, filed Aug. 17, 2006.
U.S. Appl. No. 11/509,391, filed Aug. 24, 2006.
U.S. Appl. No. 11/789,147, filed Apr. 24, 2007.
Office Action issued on Jul. 20, 2007 in U.S. Appl. No. 11/145,433.
Office Action (Interview Summary) issued on Nov. 14, 2007 in U.S. Appl. No. 11/145,433.
Response to Nov. 14, 2007 Office Action (Interview Summary) filed Dec. 4, 2007 in U.S. Appl. No. 11/145,433.
Burrows et al., "On-line Data Compression in a Log-structured File System," proceedings of the Fifth International Conference on Architectural Support for Programming Languages and Operating Systems, Oct. 12-15, 1992, ACM Press, pp. 1-21.
Rosenblum, Mendel and John K. Ousterhout, "The Design and Implementation of a Log-Structured File System," ACM Transactions on Computer Systems, vol. 10, No. 1, Feb. 1992; pp. 26-52.
"Windows Streams—An Introduction to File System Streams," printed from http://www.osronline.com, The NT Insider, vol. 13, Issue 2, Mar.-Apr. 2006, Apr. 17, 2006, 6 pages.
"Sponsor Sessions," printed from http://microsoft.com/whdc/driverdevcon/ddctracks2005/d05_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Mac OS X ABI Mach-O File Format Reference, Oct. 3, 2006, 62 pages.
Office Action issued on Aug. 3, 2009 in U.S. Appl. No. 11/145,433.
Office Action issued on Dec. 8, 2009 in U.S. Appl. No. 11/509,391.
Office Action issued on Dec. 15, 2009 in U.S. Appl. No. 12/388,712.
Office Action (Interview Summary) issued on Feb. 1, 2010 in U.S. Appl. No. 11/145,433.
Office Action issued on Mar. 30, 2010 in U.S. Appl. No. 11/789,147.
U.S. Appl. No. 12/388,712, filed Feb. 19, 2009.
Office Action issued on Jul. 12, 2010 in U.S. Appl. No. 11/509,391.
Office Action issued on May 20, 2010 in U.S. Appl. No. 12/388,712.
Notice of Allowance mailed Jul. 1, 2010 in U.S. Appl. No. 12/388,712.
Examiner's Answer issued on Jul. 7, 2010 in U.S. Appl. No. 11/145,433.

* cited by examiner

LOG-STRUCTURED HOST DATA STORAGE

BACKGROUND

The desire of computer users to become more mobile has led to increased use of server-side data storage, including web-based data storage. According to typical server-side storage arrangements, a service provider (e.g., a company or other organization, a commercial provider, etc.) implements one or more network-accessible hosts. Each host usually comprises data storage hardware and one or more servers for administering the hardware. Users of the service are able to access the hosts over the network to upload and download data files. The network may be a local area network (LAN) or a wide area network (WAN), such as the Internet. Typically, the users can access the central data store from multiple computer devices, and often from any computer device having the appropriate client software and the ability to communicate on the network.

Although server-side data storage generates conveniences for computer users, it also presents new risks and concerns. Data security is one significant concern. Because the service provider, and not the users, are in control of the data, users must rely on the service provider to maintain data security. Some users have addressed this concern by encrypting files before uploading the files to a host. This, however, requires that the entire file be transferred from client to host and back again every time that it is modified. In addition, when files are encrypted to a host, the host cannot index the files for easy retrieval by the clients/users.

SUMMARY

In one general aspect, the present invention is directed to methods of communicating data between a host and a client. The methods may comprise receiving a write request from a client. The write request may comprise first data and first metadata describing a logical position of the first data within a file. The first data may be encrypted to the host. The methods may also comprise writing the first data to a data storage. In addition, the methods may comprise writing the first metadata to the data storage. The first metadata may be written as a metadata sub-file of the file.

In another general aspect, the present invention is directed to methods of communicating data between a client and a host. The methods may comprise receiving a write request from an application. The write request may comprise first data and a first logical position of the first data within a file. The methods may also comprise encrypting the first data to the host and generating first metadata describing the first logical position. In addition, the methods may comprise the step of communicating the first data and the first metadata to the host.

FIGURES

Various embodiments of the present invention are described here by way of example in conjunction with the following figures, wherein.

DESCRIPTION

Various embodiments of the present invention are directed to systems and methods for implementing server-side storage. According to these systems and methods, a host implements data storage, which is accessible to one or more clients over a network or other suitable link. The host may be administered by a server-side storage service provider. Clients may be implemented by users of the server-side storage. The users may be employees, customers, or other affiliates of the service provider. According to various embodiments, data stored at the host may include a series of data units organized, for example, into files. The files may include data sub-files or streams, which are encrypted to the host, and metadata sub-files, which are not encrypted to the host. The streams or sub-files may be organized within the files according to a log-based organization. For example, metadata sub-files may include logical-to-physical mapping information relating each data sub-file to a logical position.

Figure 1:
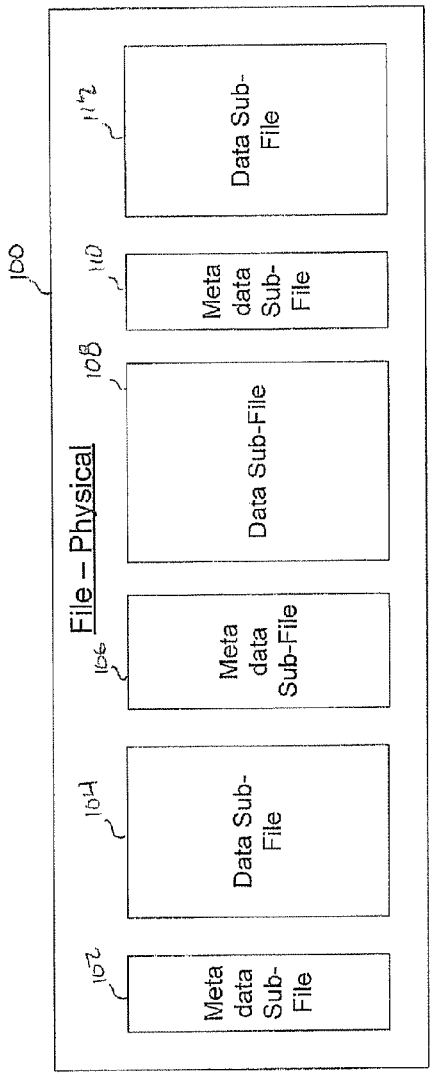
FIG. 1 shows a physical diagram of a file, according to various embodiments.

FIG. 1 illustrates an example file 100 including streams or sub-files 102, 104, 106, 108, 110, 112 organized within the file 100. Each sub-file 102, 104, 106, 108 represents an organizational unit within the file 100, and may include one or more data units. In a MICROSOFT WINDOWS environment, this concept of including streams or sub-files within a file may be called a "file system filter driver;" in a UNIX/Linux environment, it may be called a "layered" or "stackable" file system; and in MICROSOFT DISK OPERATING SYSTEM (MS-DOS), it may be called an INT21 or INT13 driver.

Figure 1A:
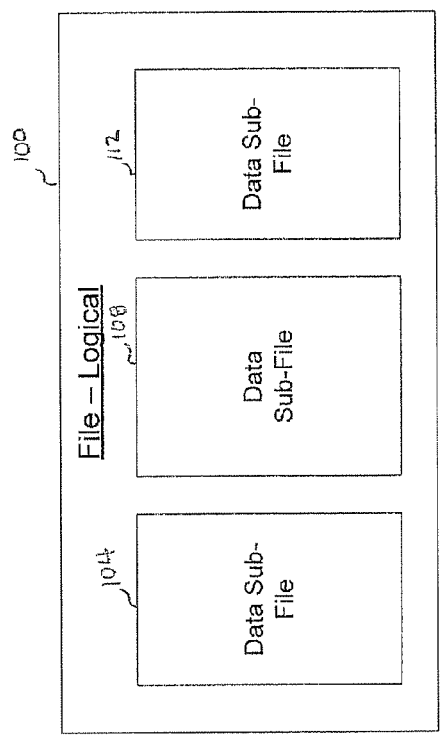
FIG. 1A shows a logical diagram of a file, according to various embodiments.

The file 100, as shown, is organized according to a log-based scheme. For example, the sub-files include data sub-files 104, 108, 112 as well as metadata sub-files 102, 106, 110. Each of the sub-files has a physical position within the file 100, as shown. The data sub-files 104, 108, 112 may also have a logical position within the file 100, for example, shown in FIG. 1A. The logical positions of the data sub-files 104, 108, 112 represent the logical order of the data sub-files, and their included data units, within the file 100. Logical-to-physical information may be kept by the metadata sub-files 102, 106, 110. For example, the metadata sub-files 102, 106, 110 may include data relating the data sub-files 104, 108, 112 to various logical positions. The metadata sub-files 102, 106, 110 may also include various other information describing the data sub-files including, for example, indexable information, etc.

Figure 2:
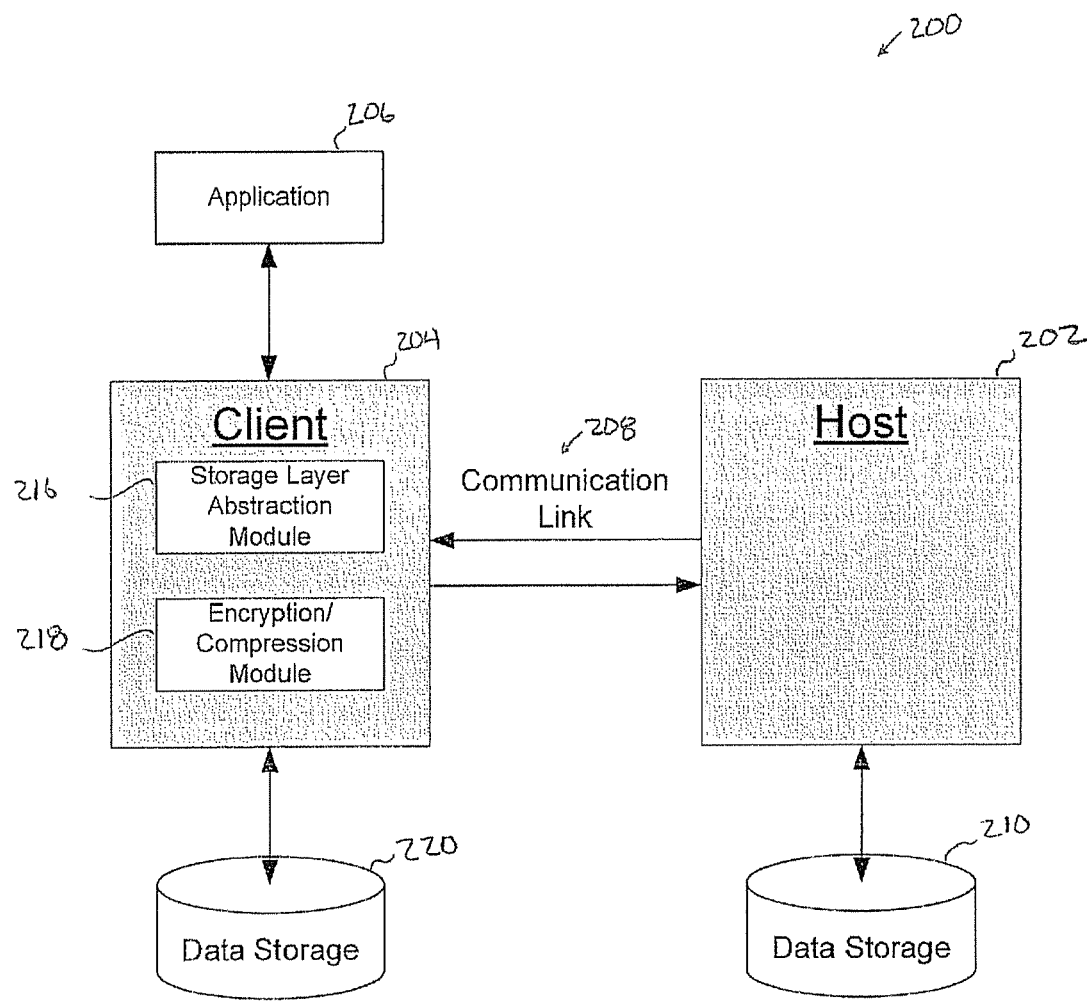
FIG. 2 shows a diagram of a network according to various embodiments.

FIG. 2 shows a system 200, according to various embodiments, for implementing server-side data storage according to a log-based organization. The system 200 includes a client 204 and a host 202 in communication with each other via a communications link 208. The client 204 and host 202 may be implemented on separate computing machines, in which case the communications link 208 may include any suitable wired or wireless link such as, for example, a LAN or WAN. According to various embodiments, the client 204 and host 202 may be implemented on a single computing machine, in which case the communications link 208 may be an internal connection within the single computing machine. The client 204 and host 202 may be configured according to any suitable communication protocol including, for example, Hypertext Transfer Protocol (HTTP). Although only one client 204 and host 202 are shown, it will be appreciated that additional clients and hosts (not shown) may be included in the system 200.

The client 204 may be in communication with an application 206. The application 206 may be any application that uses data storage including, for example, a word processing application, a spreadsheet application, etc. The application 206 may be executed by the same computing machine that implements the client 204, and may be executed from that computing machine, or from a remote server. According to various embodiments, the application 206 may be executed from a local data storage (e.g., local data storage 220) or may be executed from a remote host (e.g., host 202 or another host). The application 206 may provide read and write requests to the client 204. In response to a write request, the client 204 may forward the data unit to be written to the host 202 as one or more sub-files, as described in more detail below. In response to a read request, the client 204 may request a sub-file containing the desired data unit or units from the host 202, as described in more detail below. According to various embodiments, the client 204 may be configured such that the server-side storage arrangement is transparent to the application 206.

The host 202 may administer a server-side data storage 210. In response to requests received from the client 204, the host 202 may store data to and/or read data from the data storage 210 according to the file and sub-file organization described above. Data may be written to data storage 210 in response to a write request received from the client 204. Each request to write to data storage 210 may include one or more data sub-files that are encrypted to the host 202 and one or more metadata sub-files, which are readable by the host 202. The metadata sub-files may include data units that indicate the logical position or positions of the data sub-files within a file, such as file 100 described above. To locate a data sub-file corresponding to a particular logical position within a file, the host 202 may refer to one or more of the various metadata sub-files stored within the file.

According to various embodiments, the client 204 may be constructed in a modular fashion. For example, the client 204 may include a client module (e.g., a commercially availably HTTP client, a Distributed Authoring and Versioning ("DAV") client, etc.). The client 204 may also include a storage layer abstraction module 216 and encryption/compression module 218. The storage layer abstraction module 216 may convert read and write requests from the application 206 into the file and sub-file format described herein. The encryption/compression module 218 may encrypt and decrypt and/or compress and decompress data units included in the various sub-files.

According to various embodiments, the modules 216, 218 may be provided as plug-ins to the client module. When this configuration is used, an administrator of a server-side storage service need not provide the entire client 204 to each potential user of the service. Instead, the administrator may provide a storage layer abstraction module 216 and/or an encryption compression module 218 that users may then utilize in conjunction with a commercially available client module to implement the client 204. According to some implementations, users of the server-side storage service may provide their own encryption/compression module 218 and may tailor the module 218 to their particular security needs. For example, a user who requires a high degree of security may obtain an encryption/compression module 218 that implements a strong encryption and may require physical keys for decryption (e.g., USB keys such as the ALADDIN E-TOKEN). A user who does not require the same level of security may obtain an encryption/compression module 218 that implements a weaker encryption, and may only require a password to decrypt.

Figure 3:
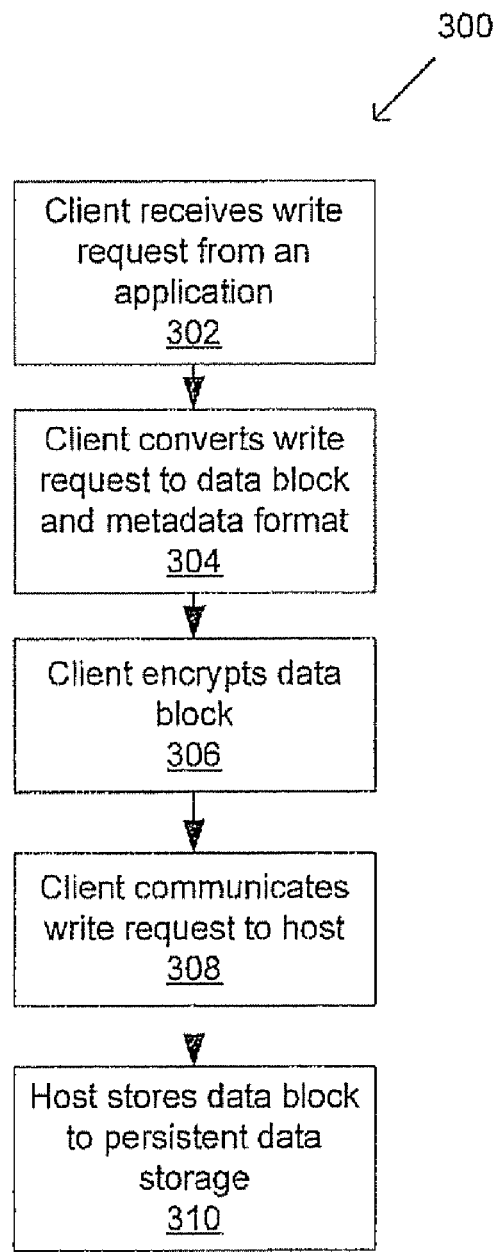
FIG. 3 shows a flow chart illustrating a process flow according to various embodiments.

FIG. 3 shows a process flow 300, according to various embodiments, illustrating a process for writing data to the data storage 210. At step 302, the client 204 may receive a write request from the application 206. The write request may include one or more data units and an indication of the logical position of the data units within a file. At step 304, the client 204 (e.g., via the storage layer abstraction module 216) may convert the write request into a file and sub-file format. For example, the client 204 may incorporate the data unit or units into one or more data sub-files. A metadata sub-file may also be created including various information characterizing the data sub-file or sub-files. For example, the metadata sub-file may include information relating the data sub-file or sub-files to a logical position within a file. The metadata sub-file may also include various data that may be used to index the data sub-file including, for example, keywords, basic descriptors, etc.

At step 306, the client 204 may encrypt the data sub-file to the host 202, for example, using the encryption/compression module 218. This may prevent the host 202, and any unauthorized third parties, from reading the data unit or units present in the data sub-file. The data sub-file or sub-files may be encrypted according to any suitable encryption algorithm including, for example, Advanced Encryption Standard (AES). According to various embodiments, the client 204 (e.g., via the encryption compression module 218) may also compress the data sub-file or sub-files. This may serve to reduce the amount of space required at data storage 210. At step 308, the client 204 may communicate the write request, now including the data sub-file or sub-files and the metadata sub-file, to the host 202 (e.g., via data link 208). In this exemplary embodiment, the write request forwarded to the host 202 does not include the entire file to be written, but instead includes only the affected sub-file or sub-files. Accordingly, it may not be necessary to transmit the entire file over the communications link 208 each time it is read or modified. This may reduce the bandwidth requirements of the system 200. At step 310, the host 202 may receive the write request, decrypt the metadata sub-file if it is encrypted, and then store the write request to data storage 210.

Prior to communicating the write request to the host, the client 204 may encrypt the metadata sub-files to third parties (e.g. according to a dual-key encryption or other similar method.) For example, the host 202 may be able to decrypt the metadata sub-files, but still may not be able to decrypt the data sub-files. In this way, all of the portions of the request may be unreadable to third parties. Also, according to various embodiments, rather than handling each write request individually, the client 204 may store write requests received from the application 206 to cache memory 220. The write requests may then be processed and communicated to the host 202, as described above, as a combined request.

Figure 4:
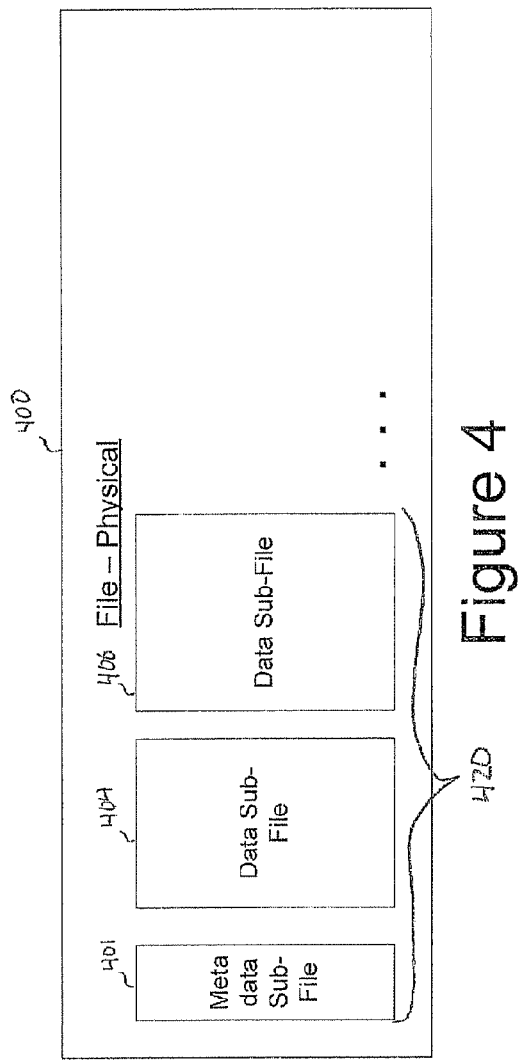
FIGS. 4, 6 and 8 show physical diagrams of a file, according to various embodiments.
Figure 5:
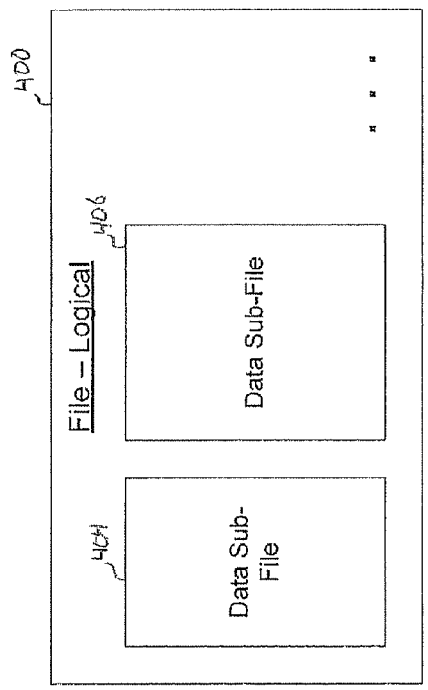
FIGS. 5, 7 and 9 show logical diagrams of a file, according to various embodiments.

FIG. 4 shows a physical diagram of an exemplary file 400 stored at the data storage 210 after a first write request 420 has been received from the host 202. The first data 420 includes data sub-files 404, 406 and metadata sub-file 401 indicating the logical positions of the data sub-files 404, 406 within the file 400. A logical diagram of the file 400 including data sub-files 404, 406 is shown in FIG. 5.

Figure 6:
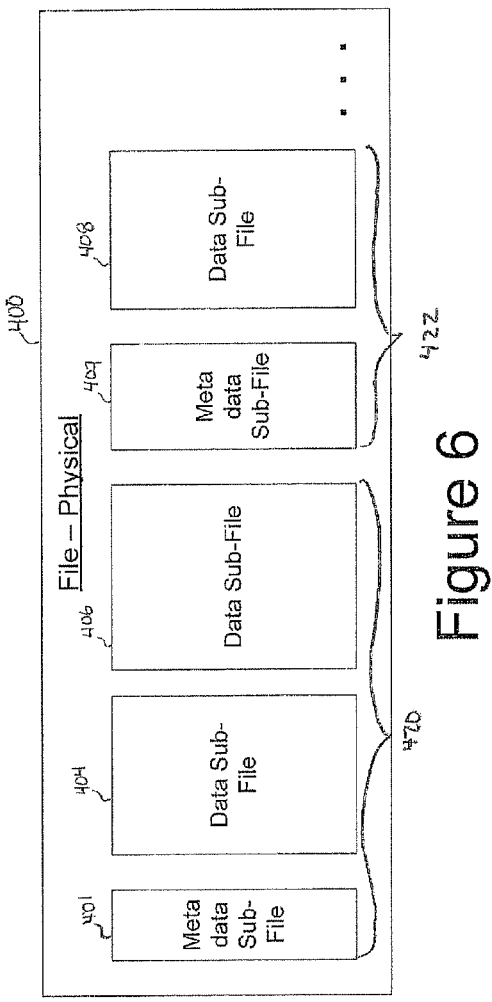
Figure 7:
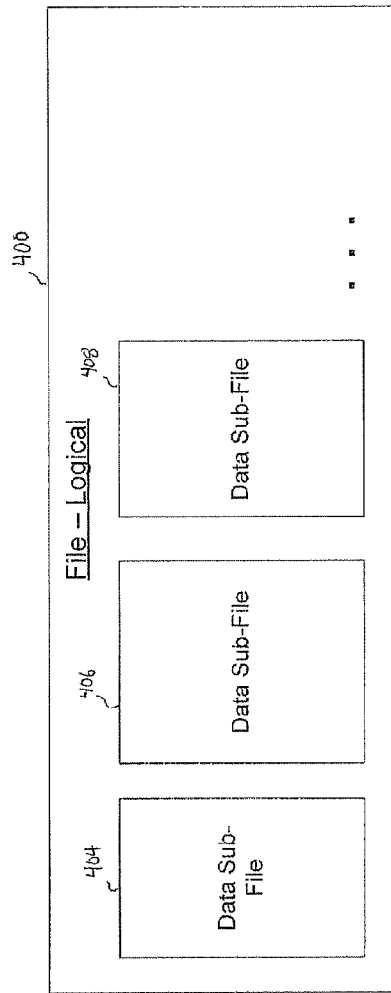
Figure 8:
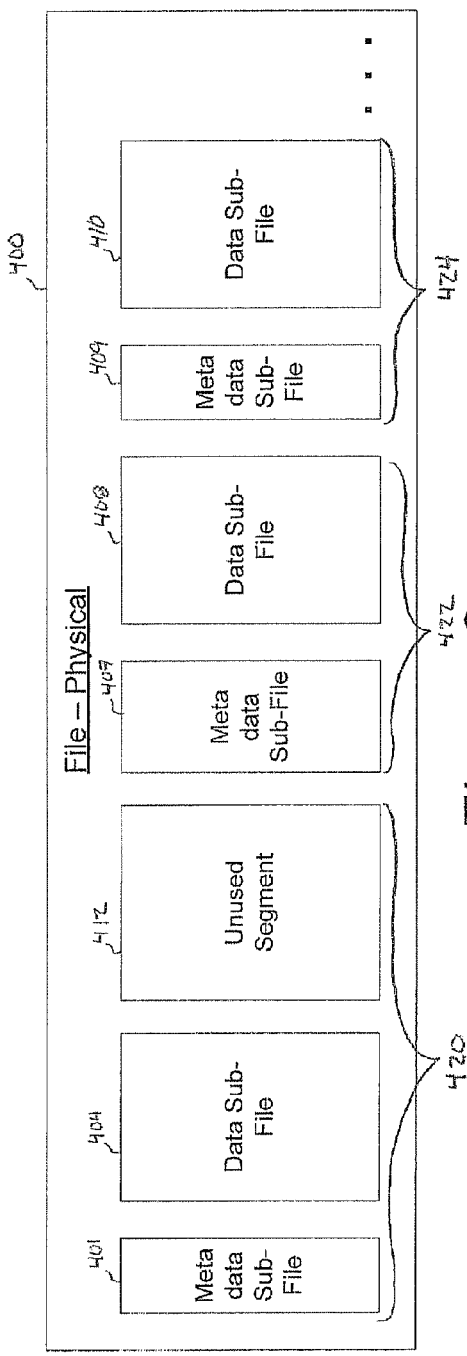
Figure 9:
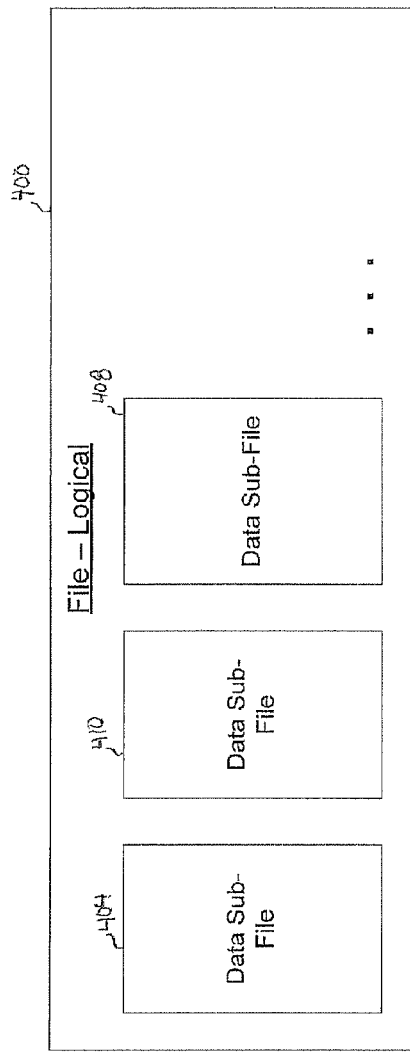

A second write request 422 may be subsequently received and stored to the file 400 after the first write request 420, for example, as shown by FIG. 6. The second write request 422 includes a data sub-file 408 and metadata sub-file 407. In the example shown, the metadata sub-file 407 indicates that the data sub-file 408 is logically positioned within the file 400 after the data sub-files 404 and 406, as shown by FIG. 7. FIG. 8 shows the data file 400 after a third write request 424 has been received. The write request 424 includes metadata sub-file 409 and a data sub-file 410. In this example, the metadata sub-file 409 indicates that the data sub-file 410 logically replaces data sub-file 406 within the file 400, as shown in FIG. 9. Because data sub-file 406 no longer has a logical position, its former physical position within the file 400 may be marked as an unused segment 412, for example, in metadata sub-file 409. The marking of the former physical position may be performed by the client 204, or may be performed by the host 202 after reading metadata provided by the client 204.

At various predetermined intervals, the host 202 may garbage collect the file 400 by shifting the locations of active data sub-files within various files, such as file 400, to overwrite any unused segments. In this way, the total amount of storage available at data storage 210 may be increased. For example, referring to FIGS. 8 and 9, metadata sub-file 407, data sub-file 408, metadata sub-file 409 and data sub-file 410 may be shifted to overwrite unused segment 412. The new physical positions of the various data sub-files may be recorded at the most recent metadata sub-file (e.g., 409). In the alternative, the host 202 may create a new metadata sub-file (not shown) recording the new physical positions of the various data sub-files. Other files (not shown) present at the data storage 210 may be garbage collected in a similar way.

Figure 10:
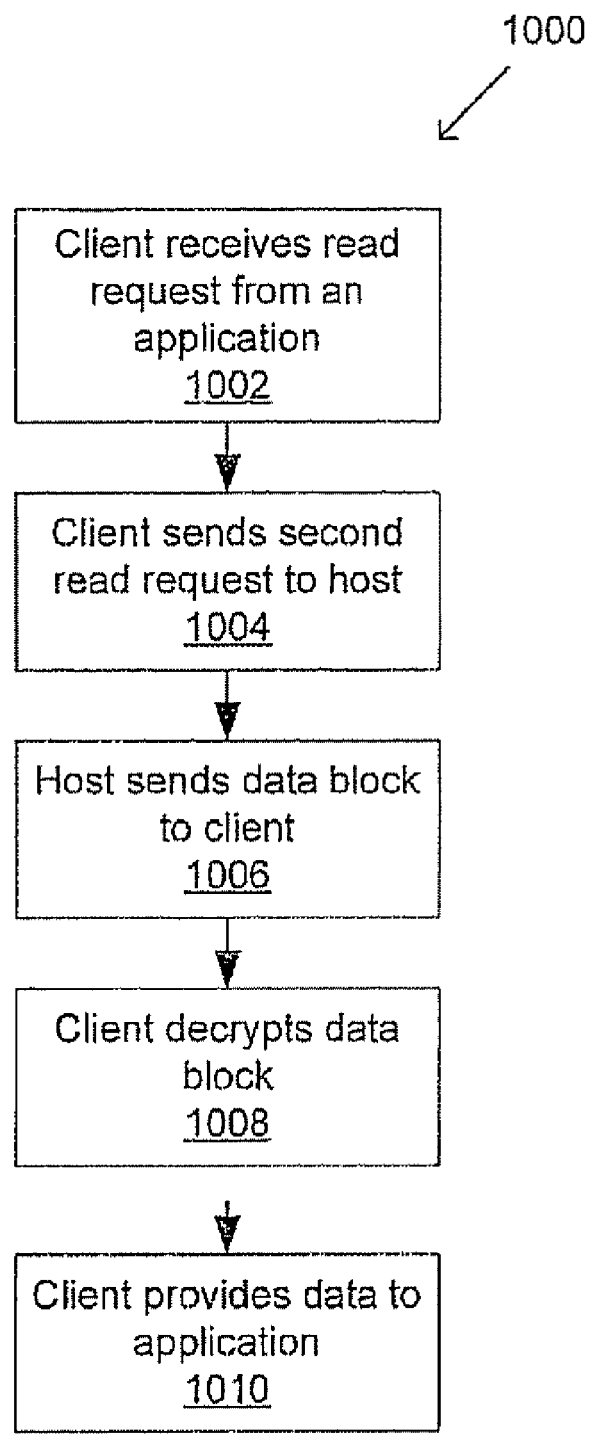
FIG. 10 shows a flow chart illustrating a process flow according to various embodiments.

FIG. 10 shows a process flow 1000, according to various embodiments, for reading data from the data storage 210. At step 1002, the client 204 may receive a read request from the application 206. The read request may identify a data unit or logical position within a file. The client 204 (e.g., utilizing the storage layer abstraction module 216) may format the read request and forward it to the host 202 at step 1004 (e.g., via data link 208). The client 204 may also encrypt the read request to third parties, however, the host 202 may have the capability to decrypt the read request. In response to the read request received from the client 202, the host 202 may, at step 106 retrieve the data sub-file or sub-files corresponding to the logical position identified by the read request and transmit the data sub-file or sub-files to the client 204 via the data link 208. For example, the host 202 may locate the physical position of the sub-file or sub-file corresponding to the identified logical position by referring to the most recent metadata sub-file recorded at data storage 210. At step 1008 the client 204 (e.g., utilizing the encryption/compression module 218) may decrypt the data sub-file or sub-files. If the data sub-file(s) were compressed prior to being stored, the client 204 may also decompress them. At step 1010, the client 204 (e.g., utilizing the storage layer abstraction module 216) may convert the data sub-files to a format readable to the application 206 and communicate them to the application 206.

According to various embodiments, the system 200 may also allow a user of the client 204 to browse or search data stored at the host 202 (e.g., at data storage 210). As described above, metadata sub-files may include indexable data describing the files and/or sub-files of which they are a part. Accordingly, the client 204 may have the capability to identify files or sub-files stored at the host 202 based on the indexable information. For example, the client 204 may have the capability to initiate a search of indexable information at the host 202 and/or browse files or sub-files based on their related indexable information.

As used herein, the phrase, "encrypted to" is used with reference to encrypted data to designate parties who are not intended to have the capability to legitimately decrypt the data. For example, if it is said that certain data is "encrypted to Party A," it means that the data is encrypted in such a way that Party A is not intended to have the capability to decrypt it. For example, Party A may not be provided with a key or other information and/or hardware necessary to decrypt.

As used herein, the term "data unit" refers to a group of related data. As used herein, the term "file" refers to an organizational unit of data. For example, a file may include one or more data units. In various non-limiting embodiments, a file may be an application data file, a database record or a file containing some or all of an executable image, such as an application program, code library, device driver, operating system image file, etc. As used herein, the terms "sub-file" and "stream" refer to an organizational unit of data organized within a file. For example, a sub-file may include one or more data units.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, a virtual computer system and/or any other computerized device or construct capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A method of communicating data between a host computer and a client computer, the method comprising:
   receiving, by the host computer, a write request from the client computer, the write request comprising first data and first metadata describing a first logical position of the first data within a file, wherein the first data is encrypted to the host computer, wherein the first metadata is unencrypted to the host computer, wherein the host computer comprises a processor and operatively associated data storage, and wherein the file is stored at the data storage;
   writing the first data to the data storage, wherein the first data is written as a data sub-file of the file, wherein the data sub-file logically replaces a second data sub-file having the same logical position;
   creating a metadata sub-file utilizing the first metadata, wherein the metadata sub-file comprises logical-to-physical mapping information linking the first logical position of the first data within the file to the physical position of the data sub-file within the file; and
   writing the metadata sub-file to the data storage, wherein the data sub-file and the metadata sub-file are organized within the file according to a log-structured organization.

2. The method of claim 1, wherein the file comprises a plurality of logical positions, and wherein first logical position is selected from the plurality of logical positions.

3. The method of claim 2, wherein the data sub-file is logically positioned after a plurality of data sub-files.

4. The method of claim 1, wherein the first data and the first metadata are encrypted to parties other than the client and the host.

5. The method of claim 1, wherein the first data is compressed according to a compression algorithm.

6. The method of claim 1, further comprising:
   receiving a read request from the client, wherein the read request identifies a second logical position within the file;
   identifying a second data sub-file organized within the file according to the log-structured organization system;
   determining a position of the second data sub-file within the file considering at least one metadata sub-file; and
   communicating the second data sub-file to the client.

7. The method of claim 6, further comprising:
   generating a second metadata sub-file comprising a mapping of the second logical position within the file to a physical position of the second data sub-file within the file; and
   communicating the second metadata to the client.

8. A system for communicating data between a client and a host, the system comprising:
   a host comprising:
      data storage hardware comprising thereon a plurality of files organized on the data storage hardware, and wherein each of the plurality of files comprises a plurality of sub-files organized within the file according to a log-structured organization, wherein the plurality of sub-files comprise at least one data sub-file and at least one metadata sub-file, wherein the at least one data sub-file is encrypted to the host and wherein the at least one metadata sub-file is unencrypted to the host; and
      at least one server in communication with the data storage hardware and configured to:
         receive a write request from a client, the write request comprising first data and first metadata describing a first logical position of the first data within a file, wherein the first data is encrypted to the host, and wherein the first metadata is unencrypted to the host;
         write the first data to the data storage hardware, wherein the first data is written as a data sub-file of the file organized within the file according to the log-structured organization, wherein the data sub-file logically replaces a second data sub-file having the same Logical position;
         create a metadata sub-file utilizing the first metadata, wherein the metadata sub-file comprises logical-to-physical mapping information linking the first logical position of the first data within the file to the physical position of the data sub-file within the file; and
         write the metadata sub-file to the data storage hardware, wherein the data sub-file and the metadata sub-file are organized within the file according to a log-structured organization.

9. The system of claim 8, wherein the at least one server is further configured to:
   receive a read request from the client, wherein the read request identifies a second logical position within the logical unit;
   identify a second data sub-file organized within the file according to the log-structured organization system; and
   communicate the second data sub-file to the client.

10. The system of claim 9, wherein the server is further configured to:
   generate a second metadata sub-file comprising a mapping of the second logical position within the file to a physical position of the second data sub-file within the file; and
   communicate the second metadata to the client.

* * * * *